United States Patent
Xu et al.

(10) Patent No.: US 10,539,980 B2
(45) Date of Patent: Jan. 21, 2020

(54) FLEXIBLE DISPLAY DEVICE

(71) Applicant: BOE TECHNOLOGY GROUP CO., LTD., Beijing (CN)

(72) Inventors: Zhiqiang Xu, Beijing (CN); Chunfang Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/546,713

(22) PCT Filed: Apr. 15, 2016

(86) PCT No.: PCT/CN2016/079382
§ 371 (c)(1),
(2) Date: Jul. 27, 2017

(87) PCT Pub. No.: WO2016/192472
PCT Pub. Date: Dec. 8, 2016

(65) Prior Publication Data
US 2018/0017994 A1    Jan. 18, 2018

(30) Foreign Application Priority Data

May 29, 2015 (CN) .......................... 2015 1 0290021

(51) Int. Cl.
*G09F 11/08* (2006.01)
*G06F 1/16* (2006.01)
(Continued)

(52) U.S. Cl.
CPC ............ *G06F 1/1652* (2013.01); *G09F 9/301* (2013.01); *G09F 11/02* (2013.01)

(58) Field of Classification Search
CPC ........ G06F 1/1652; G09F 11/02; G09F 9/301; G09F 11/08; H04M 1/0268
(Continued)

(56) References Cited

U.S. PATENT DOCUMENTS 6,629,555 B2    10/2003  DeBlock et al.
8,493,726 B2 *   7/2013  Visser ................... G06F 1/1601
                                            361/679.05
(Continued)

FOREIGN PATENT DOCUMENTS

CN        101685581 A    3/2010
CN        101952788 A    1/2011
(Continued)

OTHER PUBLICATIONS

First Chinese Office Action for Application No. 201510290021.6 dated Jan. 22, 2107.
(Continued)

*Primary Examiner* — Daniel P Cahn
(74) *Attorney, Agent, or Firm* — Calfee, Halter & Griswold LLP

(57) ABSTRACT

The provided flexible display device has supporting frames on a rolled side of the flexible display screen. When the flexible display screen and the supporting frames are drawn out of a containing body, the supporting frames are combined with the rolled side of the flexible display screen to prevent the flexible display screen from being rolled to influence the viewing effect.

6 Claims, 4 Drawing Sheets

(51) Int. Cl.
*G09F 9/30* (2006.01)
*G09F 11/02* (2006.01)

(58) Field of Classification Search
USPC .......................................................... 160/24
See application file for complete search history.

(56) References Cited

U.S. PATENT DOCUMENTS

| | | | | |
|---|---|---|---|---|
| 8,516,728 | B2* | 8/2013 | Jung | G09F 9/301 |
| | | | | 40/610 |
| 8,531,758 | B2* | 9/2013 | van Lieshout | G02F 1/133305 |
| | | | | 359/296 |
| 9,111,470 | B2* | 8/2015 | Anderson | G09F 9/301 |
| 9,189,028 | B2* | 11/2015 | Nakhimov | G06F 1/1652 |
| 9,351,599 | B2* | 5/2016 | Roberts | A47H 5/03 |
| 9,730,318 | B2* | 8/2017 | Choi | H05K 1/028 |
| 9,864,412 | B2* | 1/2018 | Park | G06F 1/1656 |
| 2004/0079844 | A1 | 4/2004 | Bailey | |
| 2004/0183958 | A1* | 9/2004 | Akiyama | G02F 1/133305 |
| | | | | 349/58 |
| 2005/0040962 | A1 | 2/2005 | Funkhouser et al. | |
| 2005/0079844 | A1 | 4/2005 | Trainor | |
| 2006/0038745 | A1* | 2/2006 | Naksen | G06F 1/1624 |
| | | | | 345/30 |
| 2007/0241002 | A1* | 10/2007 | Wu | G06F 1/1601 |
| | | | | 206/150 |
| 2008/0049003 | A1* | 2/2008 | Hasegawa | G06F 1/1615 |
| | | | | 345/206 |
| 2008/0086925 | A1* | 4/2008 | Yang | H04M 1/0268 |
| | | | | 40/610 |
| 2008/0212271 | A1* | 9/2008 | Misawa | G02F 1/133305 |
| | | | | 361/679.01 |
| 2011/0018785 | A1* | 1/2011 | Aoki | G06F 1/1601 |
| | | | | 345/1.3 |
| 2011/0018820 | A1* | 1/2011 | Huitema | G06F 1/1601 |
| | | | | 345/173 |
| 2011/0043976 | A1* | 2/2011 | Visser | G09F 9/00 |
| | | | | 361/679.01 |
| 2013/0314762 | A1* | 11/2013 | Kwack | G02F 1/09 |
| | | | | 359/280 |
| 2014/0268532 | A1* | 9/2014 | Nicol | G09F 9/301 |
| | | | | 361/679.26 |
| 2014/0292672 | A1* | 10/2014 | Choi | G06F 3/041 |
| | | | | 345/173 |
| 2015/0047796 | A1* | 2/2015 | Peng | E06B 9/42 |
| | | | | 160/323.1 |
| 2016/0120023 | A1* | 4/2016 | Choi | H05K 1/028 |
| | | | | 361/749 |
| 2016/0132281 | A1* | 5/2016 | Yamazaki | G06F 3/1446 |
| | | | | 345/1.3 |
| 2016/0205791 | A1* | 7/2016 | Kim | G06F 1/1652 |
| | | | | 361/679.01 |
| 2016/0254278 | A1* | 9/2016 | Miyaguchi | G02F 1/133305 |
| | | | | 257/72 |
| 2016/0284254 | A1* | 9/2016 | Scaturro | G09F 17/00 |
| 2016/0320804 | A1* | 11/2016 | Takayanagi | G06F 1/1615 |
| 2016/0381814 | A1* | 12/2016 | Wang | H05K 5/0017 |
| | | | | 361/807 |
| 2017/0013726 | A1* | 1/2017 | Han | H05K 1/028 |
| 2017/0018250 | A1* | 1/2017 | Shai | G06F 1/1615 |
| 2017/0103735 | A1* | 4/2017 | Oh | G06F 1/1626 |
| 2017/0278436 | A1* | 9/2017 | Chu | G09F 9/30 |
| 2017/0329368 | A1* | 11/2017 | Rho | G06F 1/1652 |
| 2018/0070467 | A1* | 3/2018 | Kim | G06F 1/1652 |
| 2018/0088654 | A1* | 3/2018 | Liu | G06F 1/3218 |
| 2018/0137840 | A1* | 5/2018 | Nemoto | G06F 1/1652 |
| 2018/0150102 | A1* | 5/2018 | Lee | G06F 1/1616 |
| 2018/0225804 | A1* | 8/2018 | Lu | G06T 3/40 |
| 2019/0042014 | A1* | 2/2019 | Ohata | G09G 5/003 |

FOREIGN PATENT DOCUMENTS

| | | |
|---|---|---|
| CN | 104378936 A | 2/2015 |
| CN | 104424844 A | 3/2015 |
| CN | 104536531 A | 4/2015 |
| CN | 104851366 A | 8/2015 |
| EP | 2837990 A2 | 2/2015 |
| EP | 2837990 A3 | 4/2015 |

OTHER PUBLICATIONS

Search Report for International Application No. PCT/CN2016/079382 dated Jul. 22, 2016.

Second Chinese Office Action for Application No. 201510290021.6 dated Jul. 3, 2017.

* cited by examiner

FLEXIBLE DISPLAY DEVICE

CROSS-REFERENCE TO RELATED APPLICATIONS

This application is based upon International Application No. PCT/CN2016/079382, filed on Apr. 15, 2016, which is based upon and claims priority of Chinese Patent Application No. 201510290021.6 filed on May 29, 2015, which is hereby incorporated by reference in its entirety as part of this application.

TECHNICAL FIELD

The present disclosure relates to the field of display technology, and more particularly to a flexible display device.

BACKGROUND

A flexible display screen has a flexible and rollable performance, and is portable compared to a traditional display screen. However, due to the flexible and rollable performance, the flexible display screen also rolls easily when it is stretched to be used, thus affecting the viewing effect.

SUMMARY

The present disclosure provides a flexible display device, including a flexible display screen; a supporting frame disposed at a rollable side of the flexible display screen; and a housing for accommodating the flexible display screen and the supporting frame, wherein the supporting frame is configured to prevent the flexible display screen from being rolled when the flexible display screen is drawn from the housing.

In one embodiment, a side of the flexible display screen provided with the supporting frame is further provided with a protection frame for protecting the flexible display screen, the protection frame has a first recess, the first recess has an opening for accommodating and holding an edge of the flexible display screen, and the protection frame includes a shoulder located at two sides of the first recess and a bottom connected to the shoulder.

In one embodiment, the supporting frame has a second recess, the second recess has an opening for accommodating and holding an edge of the flexible display screen, and the supporting frame comprises a shoulder located at two sides of the second recess and a bottom connected to the shoulder.

In one embodiment, the supporting frame is provided with an anti-roll bar along a lengthwise direction thereof, and the anti-roll bar is disposed at the bottom.

In one embodiment, the anti-roll bar is sheet-shaped.

In one embodiment, the anti-roll bar is a metal bar.

In one embodiment, the flexible display screen further comprises a drawing frame located at a drawn side of the flexible display screen, and the drawing frame is used to draw out the flexible display screen.

In one embodiment, the drawing frame is connected with the supporting frame.

In one embodiment, the housing comprises an opening through which the flexible display screen and the supporting frame are pulled out, each of two sides of the opening is provided with protrusions opposed to each other, the protrusion presses the bottom of the first recess into the opening of the second recess when the supporting frame and the flexible display screen are simultaneously drawn from the housing.

In one embodiment, the housing further comprises a first roller for winding the flexible display screen, and a second roller for winding the supporting frame and provided at two ends of the first roller, wherein the first roller has an axis perpendicular to that of the second roller.

DETAILED DESCRIPTION

The present disclosure will be described below in further detail with reference to the accompanying drawings and specific implementations, such that the technical solutions of the present disclosure may be better understood by those skilled in the art.

The First Embodiment

As shown in FIGS. 1 to 8, the present embodiment provides a flexible display device including a flexible display screen 2, a supporting frame 3 disposed at a rollable side of the flexible display screen 2, and a housing 1 for accommodating the flexible display screen 2 and the supporting frame 3. The supporting frame 3 is configured to prevent the flexible display screen 2 from being rolled when the flexible display screen 2 is drawn from the housing 1.

When the flexible display device provided by the present embodiment is in use, the flexible display screen can be extended out of the housing, and the flexible display screen is supported by the supporting frame to prevent the flexible display screen from being rolled, which affects the viewing effect. Moreover, when the flexible display device is not in use, the flexible display screen and the supporting frame may be withdrawn into the housing such that it is very portable.

Figure 1:
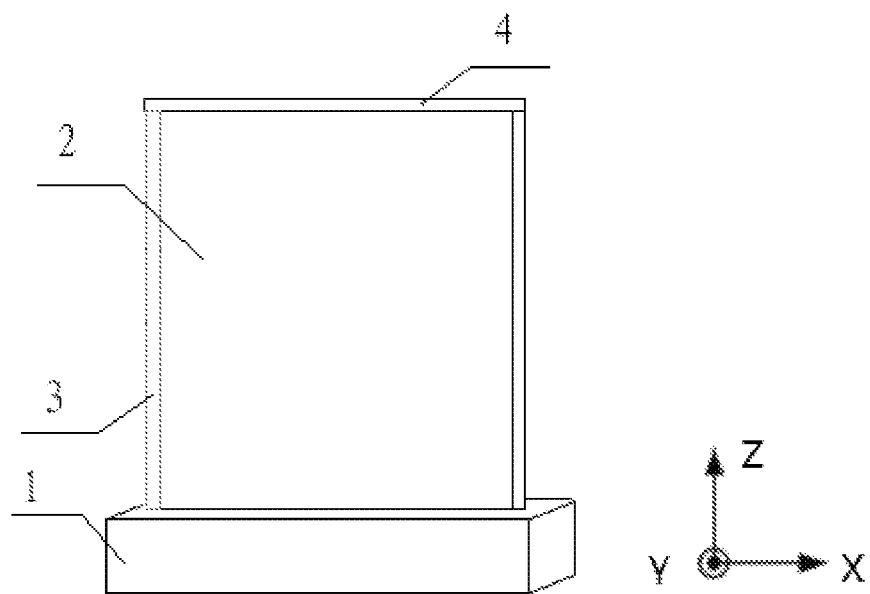
FIG. 1 is a schematic view of a structure in which a flexible display screen of a flexible display device is drawn out in a first embodiment of the present disclosure.
Figure 2:
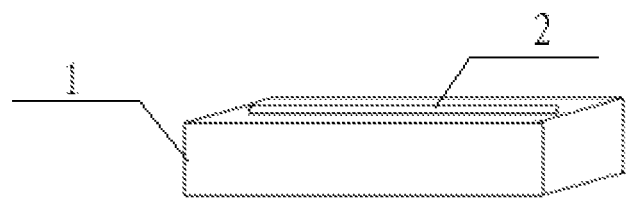
FIG. 2 is a schematic view of a structure in which a flexible display screen of a flexible display device is withdrawn into a housing in a first embodiment of the present disclosure.

FIGS. 1 and 2 show a schematic view of a structure in which the flexible display screen is in use and not in use, respectively.

Figure 3:
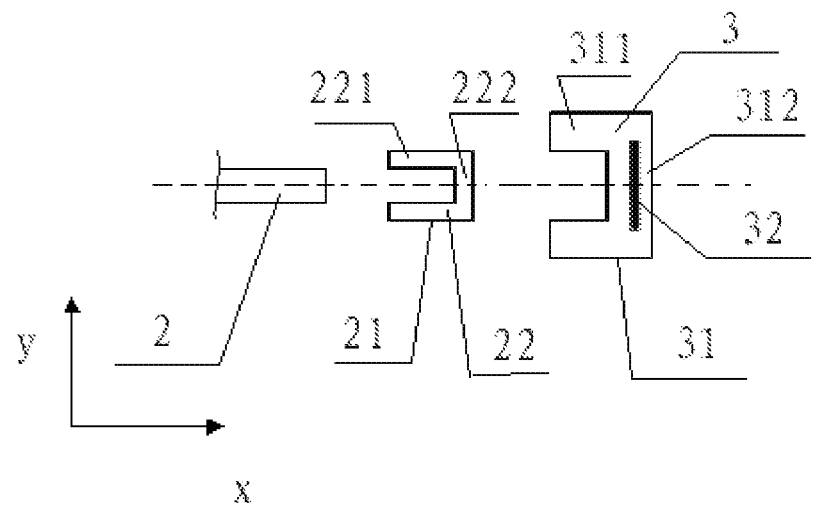
FIG. 3 is a schematic sectional view of a structure of a flexible display screen of a flexible display device, a protection frame of the flexible display screen and a supporting frame in a first embodiment of the present disclosure.

As shown in FIG. 3, in one embodiment, a side of the flexible display screen 2, which is provided with the supporting frame 3, may be also provided with a protection frame 21 for protecting the flexible display screen 2. The protection frame 21 has a first recess 22 in its cross section, and the first recess 22 has an opening for accommodating and holding the flexible display screen 2. The protection frame 21 includes a shoulder 221 located at two sides of the first recess 22 and a bottom 222 connected to the shoulder 221.

It is to be understood that the protection frame 21 and the flexible display screen 2 are separated in FIG. 3, which is simply for presenting a structure of the protection frame 21, and in fact, the protection frame 21 is attached onto the side of the flexible display screen 2, and is rolled and stretched with the flexible display screen 2.

As shown in FIG. 3, in one embodiment, the supporting frame 3 has a second recess 31 in its cross section and the second recess 31 has an opening for accommodating and holding the protection frame 21, i.e. for accommodating and holding the protection frame 21, such that the flexible display screen 2 is supported by the supporting frame 3 when the flexible display screen 2 is stretched to be used. The supporting frame 3 includes a shoulder 311 located at two sides of the second recess 31 and a bottom 312 connected to the shoulder 311.

As shown in FIG. 3, in one embodiment, the supporting frame 3 is provided with an anti-roll bar 32 along a lengthwise direction thereof, and the anti-roll bar 32 enables the supporting frame 3 to be not easily rolled along a Y direction, such that the flexible display screen 2 may not be rolled when it is stretched to be used, and a good display effect is maintained. Moreover, the anti-roll bar 32 enables the supporting frame 3 to be easily rolled along an X direction, such that the supporting frame 3 is easily to be rolled to be withdrawn. In this embodiment, the anti-roll bar 32 is sheet-shaped, which is disposed perpendicularly to the shoulder 311 of the second recess, and is disposed in the bottom 312 of the second recess.

It is to be understood that the supporting frame 3 may be formed by a material selected from a flexible rubber and the like.

As shown in FIG. 3, the anti-roll bar 32 has a thickness along the X direction, and has a width along the Y direction. In one embodiment, the anti-roll bar 32 has a width to thickness ratio greater than 3, which ensures that the anti-roll bar 32 is easily rolled along the X direction and is not easily rolled along the Y direction.

In one embodiment, the anti-roll bar 32 is a metal bar, which ensures that the anti-roll bar 32 has a flexibility along the X direction and a rigidity along the Y direction.

Figure 4:
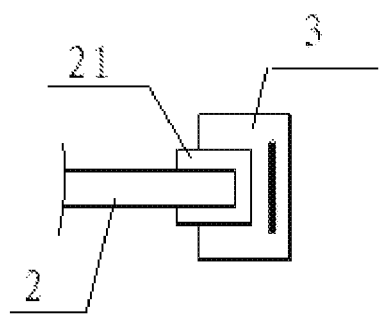
FIG. 4 is a schematic sectional view of a structure in which a protection frame of a flexible display screen of a flexible display device is coupled with a supporting frame in a first embodiment of the present disclosure.
Figure 5:
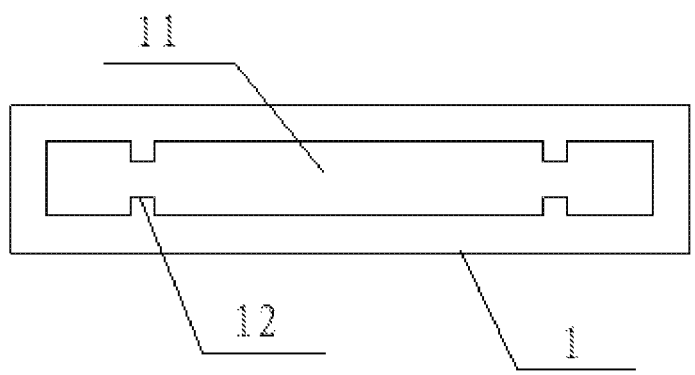
FIG. 5 is a schematic view of a structure of an opening of a housing of a flexible display device in a first embodiment of the present disclosure.

As shown FIG. 4, due to the rigidity of the anti-roll bar 32 along the Y direction, the flexible display screen 2 and the supporting frame 3 are not easily rolled when they are coupled.

In one embodiment, as shown in FIG. 1, the flexible display screen 2 further includes a drawing frame 4 located at a drawn side of the flexible display screen 2 and connected with the protection frame 21, and the drawing frame 4 is used to draw out the flexible display screen 2.

In one embodiment, the drawing frame 4 is connected with the supporting frame 3. In particular, the drawing frame 4 is connected with the supporting frame 3 in a pivotal connection. That is, the supporting frame 3 can be rotated to a certain degree with respect to the drawing frame 4 in a plane where the flexible display screen 2 is located. Of course, the drawing frame 4 may be connected with the supporting frame 3 in other connecting ways, as long as the supporting frame 3 and the drawing frame 4 are connected with each other when the flexible display screen 2 is drawn or rolled.

The drawing frame 4 remains outside of the housing 1 when the flexible display screen 2 is withdrawn into the housing 1, such that the flexible display screen 2 and the supporting frame 3 are easily pulled out by the drawing frame 4 when the flexible display screen 2 is to be used.

As shown in FIGS. 5 to 8, in one embodiment, the housing 1 includes an opening 11 through which the flexible display screen 2 and the supporting frame 3 are pulled out. The opening 11 has two sides, each of which is provided with protrusions 12 opposed to each other. The protrusion 12 is used to press the bottom 222 of the first recess into the opening of the second recess 31 when the supporting frame 3 and the flexible display screen 2 are simultaneously drawn from the housing 1.

Figure 6:
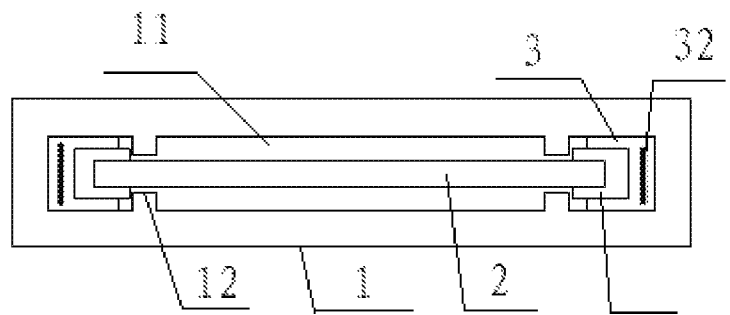
FIG. 6 is a schematic sectional view of a structure of a flexible display device in a first embodiment of the present disclosure.
Figure 7:
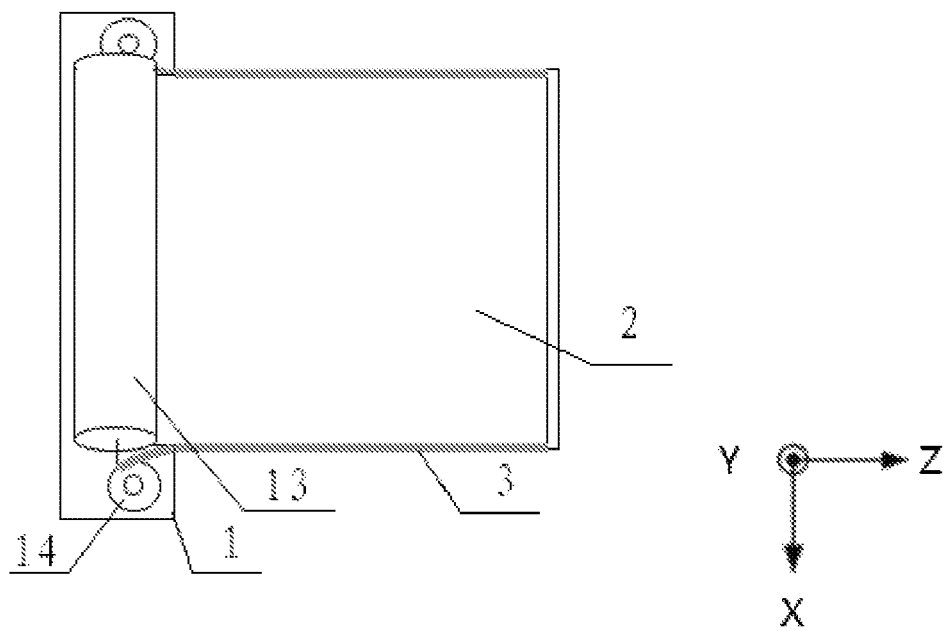
FIG. 7 is a schematic view of an internal structure of a housing of a flexible display device in a first embodiment of the present disclosure.

As shown in FIG. 6 and FIG. 7, when the flexible display screen 2 and the supporting frame 3 are pulled out by using the drawing frame 4, the flexible display screen 2 and the supporting frame 3 are coupled with each other between the protrusion 12 and sides of the opening 11 due to being pressed, such that the flexible display screen 2 is supported by the supporting frame 3.

In one embodiment, the housing 1 further includes a first roller 13 for winding the flexible display screen 2, and two second rollers 14 for winding the supporting frame 3 provided respectively at two ends of the first roller 13. The axes of the first roller 13 and the second roller 14 are perpendicular to each other, which facilitates the winding of the flexible display screen 2 and the supporting frame 3.

When the flexible display screen 2 and the supporting frame 3 are rolled, the flexible display screen 2 and the supporting frame 3 are separated by traction of the first roller 13 and the second roller 14 between the protrusion 12 and sides of the opening 11, such that the flexible display screen 2 and the supporting frame 3 are rolled onto the first roller 13 and the second roller 14, respectively.

Figure 8:
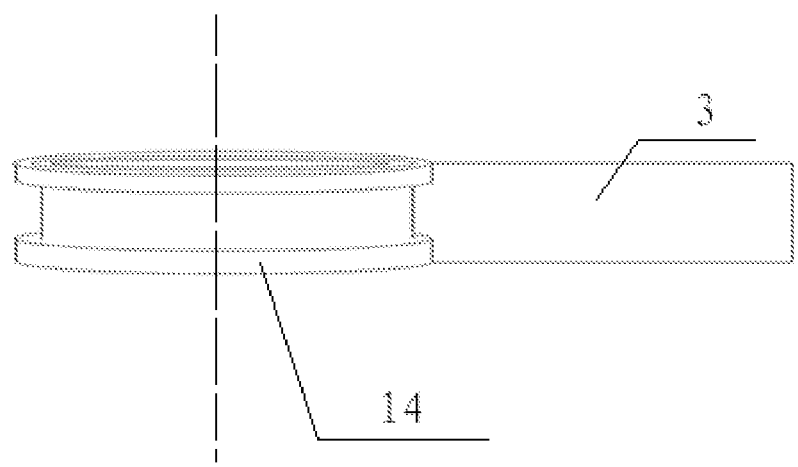
FIG. 8 is a schematic view of a structure in which a second roller in a housing of a flexible display device is rolled with a supporting frame in a first embodiment of the present disclosure.

As shown in FIG. 8, the supporting frame 3 is rolled onto the second roller 14.

It is to be understood that the first roller 13 is used to wind the flexible display screen 2. In particular, the first roller 13 may be provided at the bottom of the housing 1 just below the flexible display screen 2 to facilitate the winding of the flexible display screen 2. Moreover, for better winding of the supporting frame 3, the second roller 14 may be arranged in parallel with the plane of the supporting frame 3, that is, the axes of the first roller 13 and the second roller 14 are perpendicular to each other.

It is to be understood that the above implementations are merely exemplary implementations for the purpose of illustrating the principles of the present invention, but the present disclosure is not limited thereto. It will be apparent to those skilled in the art that various changes and modifications can be made therein without departing from the spirit and spirit of the present disclosure, which are also considered to be within the scope of the present disclosure.

What is claimed is:
1. A flexible display device, comprising:
  a flexible display screen;
  a supporting frame disposed at a rollable side of the flexible display screen; and a housing for accommodating the flexible display screen and the supporting frame, wherein the supporting frame is configured to prevent the flexible display screen from being rolled when the flexible display screen is drawn from the housing, wherein the supporting frame has a second recess, the second recess has an opening for accommodating and holding an edge of the flexible display screen, and the supporting frame comprises a shoulder located at two sides of the second recess and a bottom connected to the shoulder, wherein the supporting frame is provided with one sheet-shaped anti-roll bar disposed at the bottom of the second recess with a length extended along an entire length of the supporting frame, and wherein the anti-roll bar has a width and a thickness, and the width is larger than the thickness and smaller than the length of the anti-roll bar, and is perpendicular to a display surface of the flexible display screen when the opening of the second recess accommodates and holds the edge of the flexible display screen, wherein the housing comprises a first roller for winding the flexible display screen, and a second roller for winding the supporting frame and provided at two ends of the first roller, wherein the first roller has an axis perpendicular to that of the second roller.

2. The flexible display device of claim 1, wherein the anti-roll bar is a metal bar.

3. The flexible display device of claim 1, wherein the rollable side of the flexible display screen provided with the supporting frame is further provided with a protection frame for protecting the flexible display screen, the protection frame has a first recess, the first recess has an opening for accommodating and holding an edge of the flexible display screen, and the protection frame comprises a shoulder located at two sides of the first recess and a bottom connected to the shoulder of the protection frame.

4. The flexible display device of claim 3, wherein the housing comprises an opening for the flexible display screen and the supporting frame to be pulled out, each of two sides of the opening of the housing is provided with protrusions opposed to each other, each of the protrusions presses the bottom of the first recess into the opening of the second recess when the supporting frame and the flexible display screen are simultaneously drawn from the housing.

5. The flexible display device of claim 1, wherein the flexible display screen further comprises a drawing frame located at a drawn side of the flexible display screen, and the drawing frame is used to draw out the flexible display screen.

6. The flexible display device of claim 5, wherein the drawing frame is connected with the supporting frame.

* * * * *